UNITED STATES PATENT OFFICE.

LYMAN C. JOSEPHS, JR, OF ALLENTOWN, PENNSYLVANIA, AND GOTTFRIED WIRRER, OF PLAINFIELD, NEW JERSEY, ASSIGNORS TO INTERNATIONAL MOTOR COMPANY, OF NEW YORK, N. Y., A CORPORATION OF DELAWARE.

METHOD OF HEAT TREATMENT.

1,402,723. Specification of Letters Patent. Patented Jan. 3, 1922.

Application filed June 22, 1920, Serial No. 390,797. Renewed April 26, 1921. Serial No. 464,569.

*To all whom it may concern:*

Be it known that we, LYMAN C. JOSEPHS, Jr., and GOTTFRIED WIRRER, citizens, respectively, of the United States and the Swiss Republic, residing, respectively, in Allentown, in the county of Lehigh, in the State of Pennsylvania, and city of Plainfield, in the State of New Jersey, have invented certain new and useful Improvements in the Methods of Heat Treatment, of which the following is a specification, reference being had to the accompanying drawings, forming a part hereof.

In the heat treatment of metal, such as steel or an alloy thereof, it is well understood that when the metal reaches the decalescence or recalescence stage or critical point, or any of such stages or points, at which a change in the heat treatment should be effected, as by quenching the metal or otherwise, the rate of change of the temperature of the mass of metal under treatment itself suffers a more or less abrupt or well marked change, notwithstanding that the input or output of heat energy remains substantially constant. Such change in the rate of change of temperature has been relied upon heretofore to indicate to the observer the time at which the quenching or other change in the heat treatment should occur. It has been found, however, that the determination of this point by direct observation of the temperature of the mass of metal under treatment is unsatisfactory and inaccurate. Improvement has been sought through observation of the rate of change of temperature of a medium external to the mass of metal under treatment but in heat exchange relation therewith. Possibly greater accuracy is attained in this manner, as well as some degree of independence of composition of the mass under treatment. It has been found, however, in the development of the present invention, that practically complete certainty, entire accuracy and absolute independence of composition of the individual mass under treatment, can be attained through change in the rate of change of dimension, either expansion or contraction, of the mass of metal under treatment, it having been discovered that, with a substantially constant input or output of heat energy or change in the heat content the rate of change of expansion or contraction of the mass of metal under treatment itself undergoes a change, more or less abrupt or marked, at the time when the metal under treatment is in a decalescence or recalescence stage or at a critical point. In accordance with the present invention the quenching or other change in the heat treatment is itself brought about by such change in the rate of change of dimension of the metal under treatment at the time when such metal reaches the decalescence or recalescence stage or critical point. In this improved method of heat treatment there is in the first place a complete elimination of the human factor with a consequent reduction in liability to error. Moreover, there is a substantially complete absence of the inaccuracy due to the lag which exists in a very marked degree in determination of the critical point by direct temperature observations, as with a pyrometer, and in some degree in the determination of the critical point by observation of the rate of change of temperature of a medium external to the mass of metal under treatment but in heat exchange relation therewith. Furthermore, certainty and accuracy are the more surely capable of attainment by this method, in which the change in the rate of change of dimension of the mass of metal under treatment effects or initiates the change in heat treatment and in which all possible variations due to the interposition of other devices or media, of whatever character, are completely eliminated. Again, since the initiation or effecting of the change in heat treatment is dependent directly and solely upon the change in dimension of the particular mass of metal under treatment, every mass of metal to be treated, regardless of its shape or volume or composition or other characteristic, determines for itself the time when such change is to be initiated or effected.

Obviously the invention can be practised in many different ways and with many different forms of apparatus and in the accompanying drawing no effort has been made to show a complete apparatus for the heat treatment of metal by which or with which the present invention can be practised, but only to illustrate, in a conventional way, so much of an apparatus as may be necessary to enable the character of the invention to be understood. In the drawing—

Figure 1:
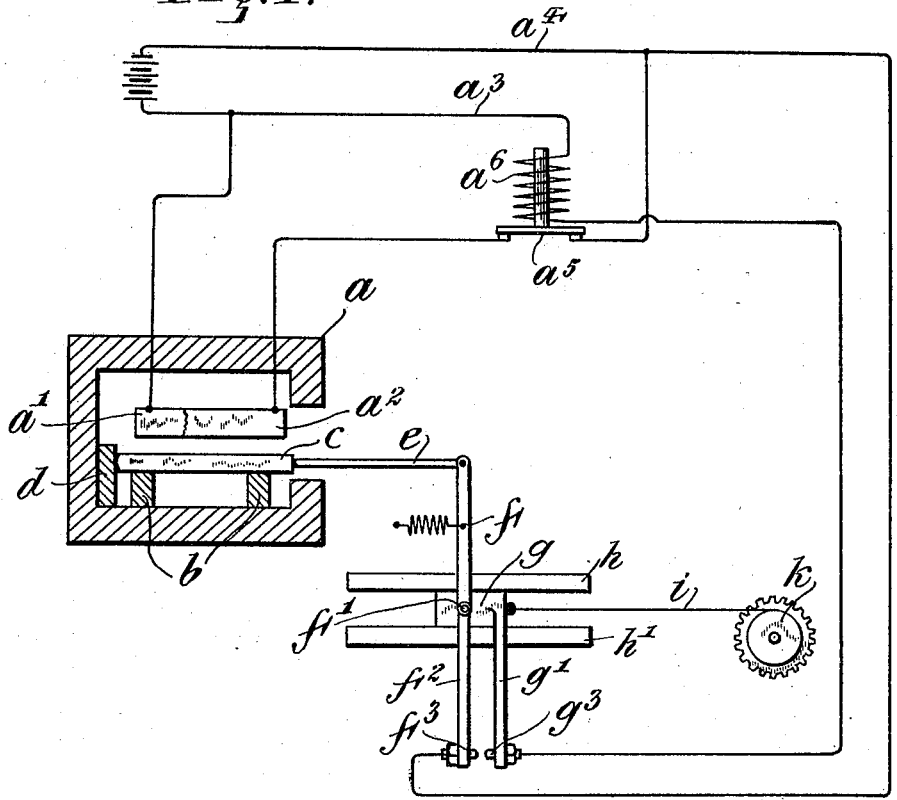
Figure 1 is a view, partly sectional and partly diagrammatic, illustrating a furnace, a mass of metal therein and apparatus by which the change in the rate of expansion of the metal under treatment initiates or effects a change in the heat treatment.
Figure 2:
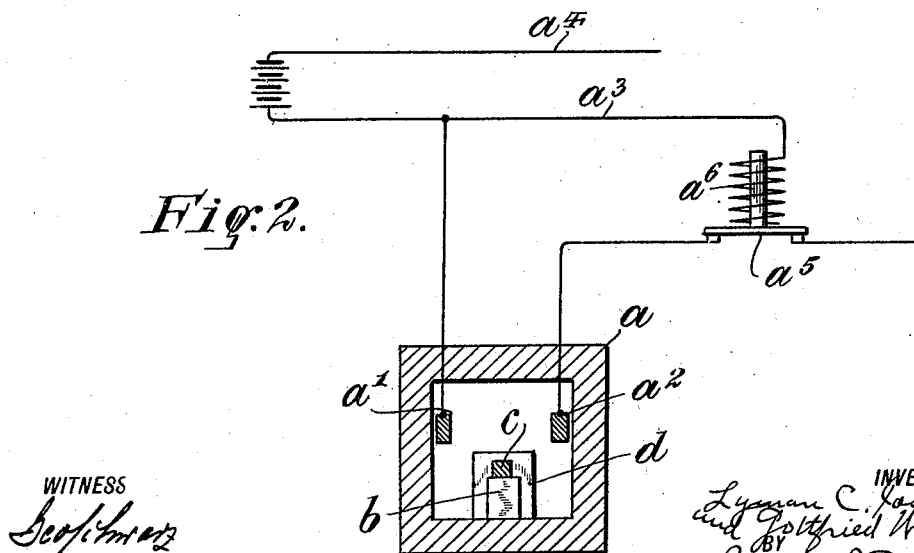
Figure 2 is a similar view of the same in part as seen from a point of view at right angles to that of Figure 1.

In the drawing a furnace of any suitable character is indicated at $a$, and resting on suitable supports $b$, $b$ therein is indicated a mass of metal $c$, with one end against an abutment $d$, while its other end is exposed through an aperture in the furnace wall. A rod $e$ is represented as bearing at one end against the mass of metal under treatment and as connected at its other end to a lever $f$ which is pivoted at $f'$ on a cross-head $g$ free to slide between guides $h$, $h'$. The cross-head is represented as connected by a cord $i$ to a drum $k$ which may be rotated by clockwork or other suitable means at a definite and controllable speed. The arm $f^2$ of the lever $f$ carries an insulated contact $f^3$ and an arm $g'$ of the cross-head $g$ carries a corresponding contact $g^3$.

The furnace is represented as an electrically heated furnace having suitable resistors $a'$ and $a^2$ connected in series with main leads $a^3$ and $a^4$ from a suitable source of electric energy, one of the connections between the resistors and the main leads including a suitable circuit breaker $a^5$, electrically operated. The contact $g^3$ is represented as connected to the corresponding main lead $a^3$ through a coil $a^6$ which controls the circuit breaker, while the other contact $f^3$ is represented as connected to the other main lead.

In the practice of the method, as illustrated in the drawing, the mass of metal to be heat treated is placed in the furnace with one end against the fixed abutment $d$ and is subjected to a substantially constant input of heat. The rod $e$ is arranged to bear against the other end of the mass of metal $c$ and, the cross-head $g$ having been placed in position such that its contact $g^3$ is a slight distance from the contact $f^3$, the clock-train is started, its speed being so regulated that the movement of the cross-head $g$ shall be the same as the normal rate of expansion of the mass of metal under treatment. So long as the input of heat is substantially constant the rate of change of dimension of the mass of metal will be constant until the critical point is reached, when the abrupt change in the rate of change of dimension of the mass of metal will permit the upper end of the lever $f$ to fall back slightly with respect to the cross-head $g$, under the influence of the spring $f^4$ and will therefore permit the two contacts $f^3$ and $g^3$ to complete the circuit through the coil of the circuit breaker and operate the circuit breaker to cut off current from the resistors of the furnace, the change in the rate of change of dimension of the metal under treatment, which takes place as the metal reaches the critical point, thus itself initiating or effecting the change in the heat treatment, which is here suggested as a cessation of heat input, although it might be any other change. If the metal under treatment were being subjected to a withdrawal of heat the change in the rate of change of dimension of the metal when it passes through the recalescence stage might in a similar manner initiate a change in the heat treatment.

It will be understood that the apparatus above described is intended to serve only to enable the character of the invention to be appreciated clearly and that the invention is not in any way limited to the particular character of the apparatus employed in its practice.

We claim as our invention:

1. The improvement in the method of heat treatment of metal, as steel or an alloy thereof, which consists in initiating a change in heat treatment through the change in the rate of change of dimension of the metal under treatment when it passes through a critical point.

2. The method of heat treating metal, as steel or an alloy thereof, which consists in changing the heat content of the metal and causing the change in the rate of change of dimension of the metal, when it passes through a critical point, to inititate a change in the heat treatment of the metal.

This specification signed this 18th day of June A. D. 1920.

LYMAN C. JOSEPHS, Jr.
GOTTFRIED WIRRER.